(12) United States Patent
Gershman

(10) Patent No.: US 8,340,968 B1
(45) Date of Patent: Dec. 25, 2012

(54) SYSTEM AND METHOD FOR TRAINING DICTION

(75) Inventor: Vladimir Gershman, Holland, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 949 days.

(21) Appl. No.: 11/971,610

(22) Filed: Jan. 9, 2008

(51) Int. Cl.
*G10L 11/00* (2006.01)
*G10L 21/00* (2006.01)
*G09B 19/06* (2006.01)
*G09B 19/00* (2006.01)

(52) U.S. Cl. ........ 704/270; 434/156; 434/157; 434/322; 704/9; 704/236; 704/270.1; 705/17

(58) Field of Classification Search .................. 704/270; 434/156, 157
See application file for complete search history.

(56) References Cited

U.S. PATENT DOCUMENTS

| 4,383,135 | A   | * | 5/1983  | Scott et al. ..................... 704/236 |
|-----------|-----|---|---------|-------------------------------------------|
| 5,729,694 | A   | * | 3/1998  | Holzrichter et al. ............ 705/17    |
| 5,766,015 | A   | * | 6/1998  | Shpiro .......................... 434/156 |
| 6,077,085 | A   | * | 6/2000  | Parry et al. ..................... 434/322 |
| 6,302,695 | B1  | * | 10/2001 | Rtischev et al. ............... 434/157   |
| 2004/0006461 | A1 | * | 1/2004 | Gupta et al. ................... 704/200  |
| 2004/0176960 | A1 | * | 9/2004 | Shpiro et al. .................. 704/277  |
| 2005/0175970 | A1 | * | 8/2005 | Dunlap et al. ................. 434/185   |
| 2006/0057545 | A1 | * | 3/2006 | Mozer et al. ................... 434/156  |
| 2006/0253287 | A1 |   | 11/2006 | Kammerer et al.                          |
| 2007/0011008 | A1 |   | 1/2007  | Scarano et al.                            |
| 2007/0233498 | A1 |   | 10/2007 | Silverman et al.                          |

\* cited by examiner

*Primary Examiner* — Justin Rider
(74) *Attorney, Agent, or Firm* — Howard IP Law Group, PC

(57) ABSTRACT

A computer-implemented method for automatically training diction of a person acquires a speech data stream of the person as the person is speaking, compares the words in the speech data stream to a set of predefined undesirable phrases provided in a look-up table and upon detection of one of the predefined undesirable phrases in the speech data stream, alerting the person by an alarm.

7 Claims, 2 Drawing Sheets

SYSTEM AND METHOD FOR TRAINING DICTION

CROSS-REFERENCE TO RELATED APPLICATIONS

None

FIELD OF THE INVENTION

The present disclosure relates to automatic monitoring of a person's speech for training diction of the person.

BACKGROUND

As children's speech develops, many parents are concerned with whether the children's speech pattern or diction meets certain desired custom and standard in terms of their selection of words as well as their use of proper grammar. When parents are with their children, the parents can correct the children when they use undesired words or use incorrect grammar. However, when the parents are not with the children, it will be difficult for the parents to provide proper coaching.

SUMMARY

A computer-implemented method for automatically training diction of a person is disclosed. The method comprises acquiring a speech data stream of the person as the person is speaking, identifying words in the speech data stream, comparing the words in the speech data stream to a set of predefined phrases provided in a look-up table and alerting the person upon detection of one of the predefined phrases in the speech data stream, wherein the predefined phrases are a collection of undesirable phrases.

According to another embodiment, an automated system for training diction of a person comprises a speech processing unit for monitoring a speech data stream to identify an occurrence of a predefined phrase in the speech data stream and an alarm unit that, upon detection of one of the predefined phrase, generates an alarm signal notifying the speaker.

BRIEF DESCRIPTION OF THE DRAWINGS

These and other features and advantages of the present invention will be more fully disclosed in the following detailed description of the preferred embodiment of the invention, which is to be considered together with the accompanying drawings wherein like numbers refer to like parts, and further wherein.

DETAILED DESCRIPTION

Figure 1:
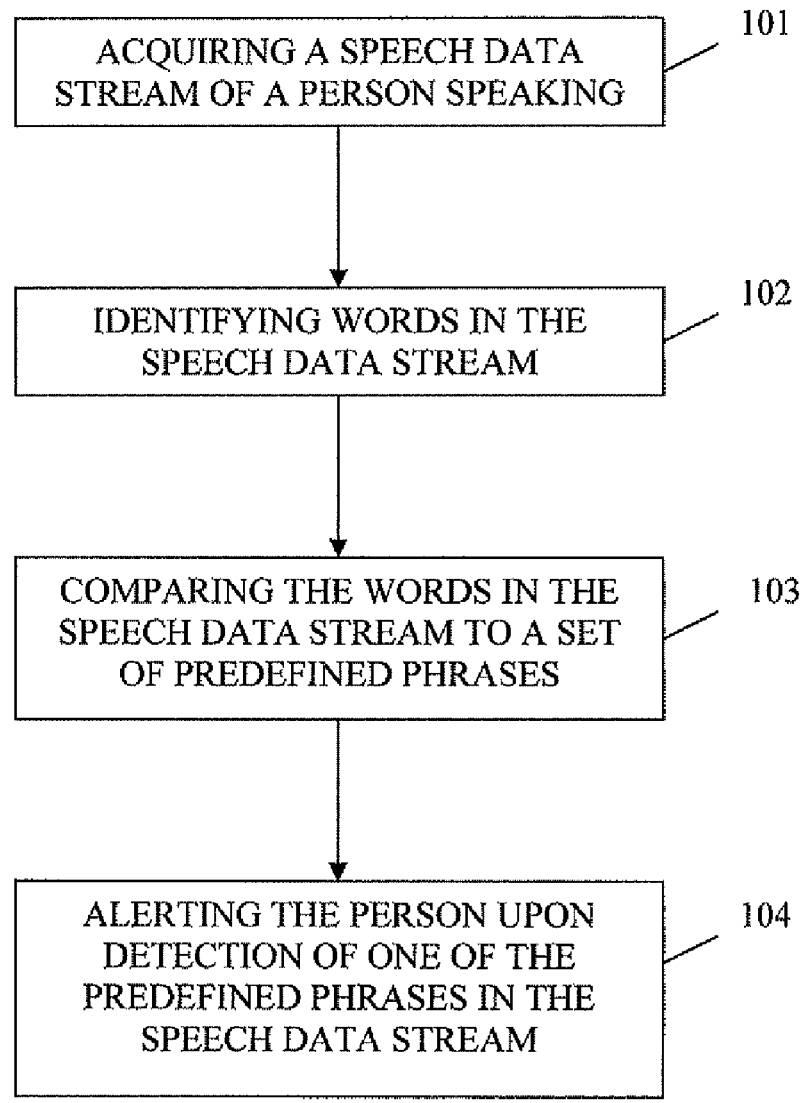
FIG. 1 is a flowchart of the method according to an embodiment of the present disclosure.

This description of the preferred embodiments is intended to be read in connection with the accompanying drawings, which are to be considered part of the entire written description of this invention. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, such as "attached," "attaching," "mounted," and "mounting" are used interchangeably and refer to one structure or surface being secured to another structure or surface, unless expressly described otherwise.

Referring to FIG. 1, a computer-implemented method for automatically training diction of a person according to an embodiment comprises acquiring a digitized speech data stream of the person as the person is speaking (see box 101), identifying words in the speech data stream (see box 102), comparing the words identified in the digitized speech data stream to a set of predefined phrases stored in a look-up table (see box 103), wherein the predefined phrases are a collection of undesirable phrases, and then alerting the person upon detection of one of the predefined phrases in the speech data stream (see box 104).

The method provides a real-time feed back to the speaker when the speaker utters one of a predefined set of undesirable phrases. The term "phrase" as used in this disclosure refers to an expression consisting of one or more words. The predefined undesirable phrases can be words or grammatically incorrect phrases. Thus, this method can be embodied in a portable computerized device that a person can carry in a shirt pocket or wear around the neck and used to train the person to speak with a proper or a desirable diction. Because what is deemed desirable can be a subjective determination, the method allows the user to customize the content of the look-up table or use a standard look-up table. This method can be very useful and desirable for parents for training their young children, pre-teens or teenagers on the art of speaking with proper diction. For example, the method can utilize a look-up table that contains a list of obscenities that the parents do not want their children to use or can contain such phrases as "you know," "I did good," etc. or interjections as "um . . . ." that are generally not desired in proper diction. The customizable feature of the look-up table allows the method to focus on particular phrases.

The alerting of the speaking person can include the use of an audible alarm such as a beep or a chime. The alerting can also include the use of a visual cue such as a blinking light or a single pulse of a light. A light source from a variety of available sources such as an LED or a small light bulb. The alerting can also include a tactile means such as a vibrating device or any other appropriate means. The alerting can include one of these alerting means or a combination of one or more of these alerting means.

Figure 2:
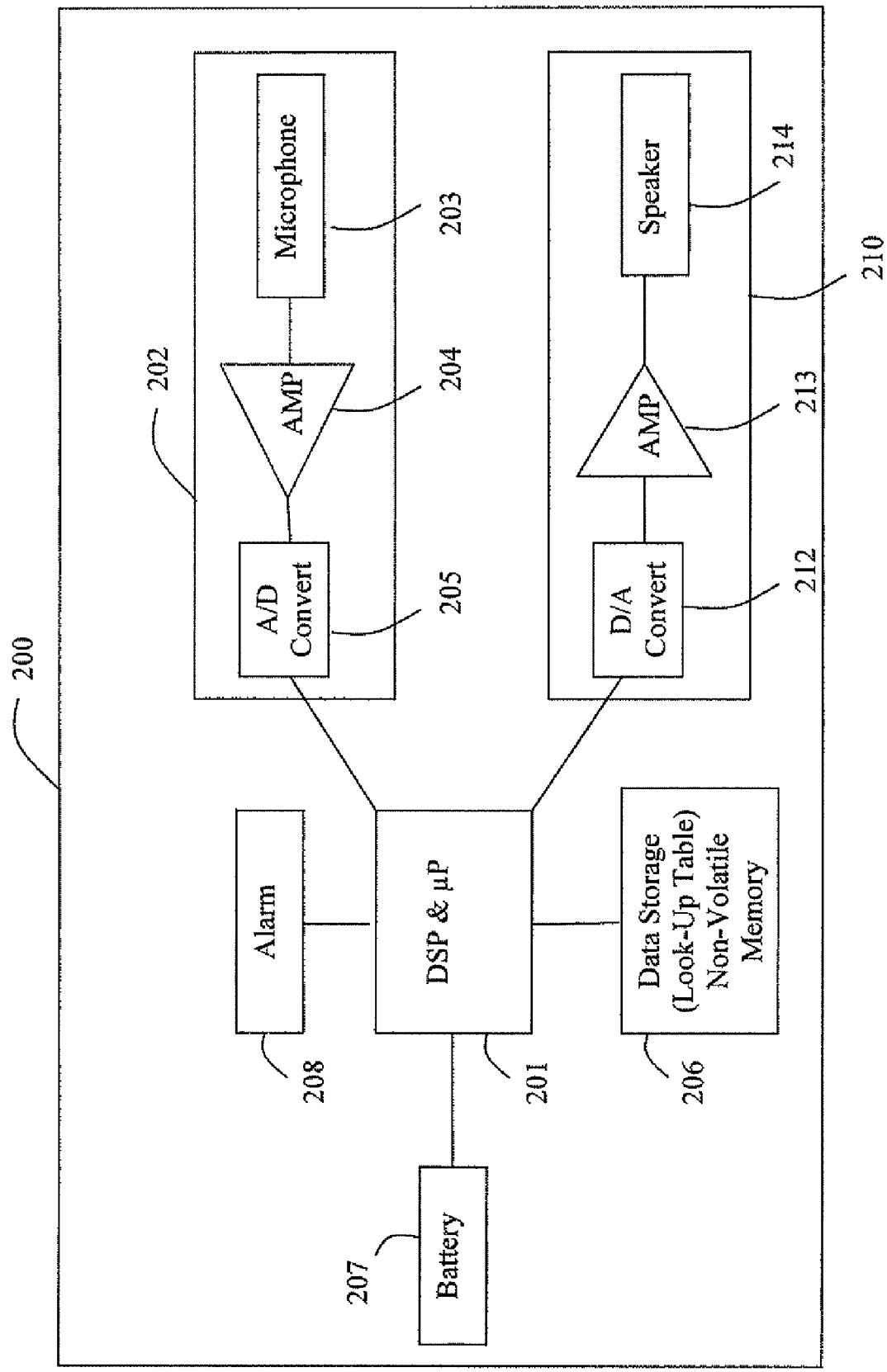
FIG. 2 is a schematic block diagram of a device according to another embodiment of the present disclosure.

According to another embodiment, FIG. 2 shows a block diagram of an example of a computerized system or a device 200 for implementing the method described above for training diction of a person. The system 200 comprises an audio input unit for acquiring the person's speech data stream. The audio input unit 202 can comprise a microphone 203 and an amplifier 204 for capturing or acquiring the person's speech as audio signal. The audio input unit 202 can also include an analog-to-digital (AID) converter 205 to produce a digitized speech data stream from the audio signal. The speech data stream from the audio input unit 202 is provided to a speech processing unit 201 that can comprise a digital signal processor (DSP) and a microprocessor. The speech processing unit 201 processes and monitors the digital speech data stream to identify an occurrence of a predefined undesirable phrase in the speech data stream. The speech processing unit 201 can incorporate one of a variety of speech recognition technology to identify words in the speech data stream and compare the spoken words on a real-time-basis to a list of predefined undesirable phrases. A number of voice and speech recognition programs are available that can be used in the present method. One can obtain a library of off-the-shelf routines and use it to program a DSP integrated circuit device. DSP integrated circuit devices that have sufficient processing power suitable for implementing in a portable system 200 are available from Analog Devices Inc. or Texas Instruments Inc.

The predefined phrase can comprise a listing of undesired phrases the person should not be uttering. The predefined set of phrases can be provided in a database or a look-up table format on a data storage unit 206. The data storage unit 206 can be a hard disk storage unit, a flash memory device (such as an EEPROM) or other suitable data storage device.

In a preferred embodiment, the system 200 is a portable device that can be readily carried by the person whose diction is being monitored and thus the data storage unit 206 is a compact and light-weight flash memory device. In addition to the portability and compactness, additional benefit of using a flash memory type device for the data storage unit 206 is that the data storage unit 206 in a flash memory format can be configured to be removable from the system 200. Then, the data storage unit 206 can be removed or unplugged from the system 200 and interfaced with a general purpose PC-type computer for modifying or customizing the look-up table containing the predefined set of undesirable phrases or load a whole new look-up table. Also the system 200 can be programmed to track the number of alarms over time and store the information on the data storage unit 206. One can then look at the progress made by the speaker over time on the PC computer and see whether the number of violations decreases or increases. A software program running on the PC can be provided as a companion to the portable system 200. The software will have the ability to change the look-up table, count alerts, draw a progress graph or give percentage of the behavior improvement.

The system 200 also comprises an alarm unit 208 that the speech processing unit 201 can use to generate an alarm signal upon detection of one of the predefined undesirable phrases provided in the look-up table. The purpose of the alarm signal is to alert the person speaking that he/she has uttered an undesirable phrase. As discussed above, the alarm signal can be an audible alarm, a visual alarm, a tactile alarm or any other suitable means of alerting the speaking person.

According to another embodiment, in addition to alerting the speaking person of an incorrect or undesirable diction with an alarm, the method of the present disclosure can also provide the person with an audio playback of a proper phrase. The speech processing unit 201 of the system 200 would be configured with a speech synthesis firmware that enables the audio playback feature. Each entry in the look-up table of the undesirable phrases in the data storage unit 206 can have a speech synthesis data corresponding to the correct phrase. When the speech processing unit 201 detects one of the undesirable phrases in the speech data stream, the speech processing unit 201 can playback the correct phrase according to the speech synthesis data. The audio playback can be provided in addition to the alarm or in lieu of the alarm. The system 200 can be configured to allow the speaker to electively playback the correct phrase. The system 200 can be provided with a button which the speaker would press after the alarm has gone off to hear the correct phrase played back by the system 200.

To enable playback of the correct phrase, the system 200 can be provided with an audio playback unit 210. The audio playback unit 210 is provided with a digital to analog (D/A) converter 212 to convert the digitized speech output from the speech processing unit 201 into an analog signal. A second amplifier unit 213 is provided to drive the speaker unit 214 for audio playback of the correct phrase for the speaking person.

The system 200 can be embodied in a device that can be worn around the person's neck. The system 200 can also be a device that can be carried on the person such as in the person's shirt pocket. As a portable device, the system 200 can include a battery 207 as a power source.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A computer-implemented method for automatically training diction of a person using an automated system comprising an audio input unit for acquiring the person's speech data stream; a speech processing unit configured with a speech data monitoring program code; and an alarm unit for generating an alarm signal, said method comprising:
   acquiring a speech data stream of the person using the audio input unit as the person is speaking;
   identifying words in the speech data stream using the speech processing unit;
   comparing the words in the speech data stream to a set of predefined undesirable phrases that are grammatically incorrect provided in a look-up table using the speech processing unit;
   generating the alarm signal using the alarm unit upon detection of at least one of the predefined undesirable phrases that are grammatically incorrect from the look-up table in the speech data stream,
   storing the number of alarms generated over time, and
   generating an output indicative of the progress of the speaker according to either an increase or decrease in the number of alarms generated over time.

2. The method of claim 1, wherein the speech data stream is a digitized data stream.

3. The method of claim 1, wherein alerting the person generating the alarm signal includes generating an audible alarm.

4. The method of claim 1, wherein alerting the person generating the alarm signal includes generating a visible alarm.

5. The method of claim 1, wherein alerting the person generating the alarm signal includes generating a tactile alarm.

6. The method of claim 1, wherein the comparison is independent of the pronunciation of the undesirable phrase by the person speaking.

7. The method of claim 1, further comprising the step of generating an audio playback of a grammatically correct phrase in response to the detection of said at least one of the predefined undesirable phrases in the speech data stream.

* * * * *